US007705320B2

(12) United States Patent
Soldner

(10) Patent No.: US 7,705,320 B2
(45) Date of Patent: Apr. 27, 2010

(54) RADIATION DETECTOR WITH CO-PLANAR GRID STRUCTURE

(75) Inventor: Stephen A. Soldner, Butler, PA (US)

(73) Assignee: Endicott Interconnect Technologies, Inc., Endicott, NY (US)

(*) Notice: Subject to any disclaimer, the term of this patent is extended or adjusted under 35 U.S.C. 154(b) by 0 days.

(21) Appl. No.: 12/297,747

(22) PCT Filed: Apr. 23, 2007

(86) PCT No.: PCT/US2007/067181

§ 371 (c)(1),
(2), (4) Date: Oct. 20, 2008

(87) PCT Pub. No.: WO2008/054862

PCT Pub. Date: May 8, 2008

(65) Prior Publication Data

US 2009/0236535 A1 Sep. 24, 2009

Related U.S. Application Data

(60) Provisional application No. 60/793,917, filed on Apr. 21, 2006.

(51) Int. Cl.
*G01T 1/24* (2006.01)

(52) U.S. Cl. ................................................ 250/370.13

(58) Field of Classification Search ............ 250/370.13, 250/591
See application file for complete search history.

(56) References Cited

U.S. PATENT DOCUMENTS 5,530,249 A 6/1996 Luke
5,757,040 A 5/1998 Saito et al.
5,777,338 A 7/1998 He
6,034,373 A 3/2000 Shahar et al.
6,043,106 A 3/2000 Mescher et al.
6,218,668 B1 * 4/2001 Luke .................... 250/370.01
6,566,676 B1 * 5/2003 Kuwabara .................. 250/591
6,781,134 B1 8/2004 Murray et al.
2006/0027800 A1 2/2006 MacPherson et al.
2007/0001122 A1 * 1/2007 Gros D'aillon et al. 250/370.13

OTHER PUBLICATIONS

P.N. Luke et al.: "A CdZnTe coplanar-grid detector array for environmental remediation", Nuclear Instruments and Methods in Physics Research A 458 (2001), pp. 319-324.

P.N. Luke: "Unipolar Charge Sensing with Coplanar Electrodes—Application to Semiconductor Detectors", IEEE Transactions on Nuclear Science, vol. 42, No. 4, Aug. 1995.

* cited by examiner

*Primary Examiner*—Constantine Hannaher
(74) *Attorney, Agent, or Firm*—Mark Levy; Hinman, Howard & Kattell

(57) ABSTRACT

A semiconductor radiation detector (1', 1", 1''', 1'''') includes a body of semiconducting material (2) responsive to ionizing radiation for generating electron-hole pairs in the bulk of said body (2). A conductive cathode (4) is disposed on one side of the body (2) and an anode structure (6) is disposed on the other side of the body (2). The anode structure (6) includes a first set of spaced elongated conductive fingers (8) in contact with the body (2) and defining between each pair of fingers thereof an elongated gap (10) and a second set of spaced elongated conductive fingers (12) positioned above the surface of the body (2) that includes spaced elongated conductive fingers (8). Each finger of the second set of spaced elongated conductive fingers (12) overlays, either partially or wholly, the elongated gap between a pair of adjacent fingers of the first set of spaced elongated conductive fingers (8).

16 Claims, 6 Drawing Sheets

RADIATION DETECTOR WITH CO-PLANAR GRID STRUCTURE

BACKGROUND OF THE INVENTION

1. Field of the Invention

The present invention relates to semiconductor radiation detectors and, more particularly, to a semiconductor radiation detector having an improved electrode design.

2. Description of Related Art

With reference to FIGS. 1 and 2, a typical, prior art configuration of a co-planar grid (CPG) radiation detector 1, such as, without limitation, $Cd_xZn_{1-x}Te$, ($0 \leqq x \leqq 1$), detector, includes metal or non-metal conductive electrodes on opposing surfaces. More specifically, a body of radiation detector material 2, e.g., $Cd_xZn_{1-x}Te$, ($0 \leqq x \leqq 1$), has a continuous cathode electrode 4 on one face of body and an anode structure 6 comprised of two sets of elongated conductors 8 and 12 which are interconnected to form two independent, interdigitated grid electrodes on the face of body 2 opposite cathode 4.

Anode structure 6 includes a first anode conductor comprised of a first set of elongated conductors 8 spaced from each other and defining elongated gaps 10 between each pair of adjacent anode conductors 8. Herein, anode conductors 8 are also called "collecting anodes". Anode structure 6 also includes a second anode conductor comprised of a second set of elongated conductors 12 spaced from each other and defining elongated gaps 14 therebetween. Herein, anode conductors 12 are also called "non-collecting anodes".

As shown in FIGS. 1 and 2, with the exception of one collecting anode 8 on an end thereof, each collecting anode 8 is disposed in a gap 14 between, desirably intermediate, a pair of adjacent non-collecting anodes 12. Similarly, with the exception of one non-collecting anode 12 on an end thereof, each non-collecting anode 12 is positioned in a gap 10 between, desirably intermediate, a pair of adjacent collecting anodes 8. Desirably, adjacent collecting and non-collecting anodes 8 and 10 are separated from each other by a gap 21. However, this is not to be construed as limiting the invention since the gap between each pair of adjacent collecting and non-collecting anodes 8 and 12 can be any suitable and/or desirable distance deemed suitable and/or desirable by one of ordinary skill in the art.

All of the collecting anodes 8 can be coupled to an optional collecting bond pad 16 either directly or by way of a lateral conductor 18. Similarly, all of the non-collecting anodes 12 can be connected to an optional non-collecting bond pad 20 either directly or by way of a lateral conductor 22. Optional bond pads 16 and 20 can be utilized to facilitate connecting collecting anodes 8 and non-collecting anodes 12 to suitable electrical biases (not shown).

Anode structure 6 can be surrounded by an optional guard ring 24 as is known in the art. Lastly, radiation detector 1 desirably includes on the sides thereof an insulator 26. Desirably, insulator 26 is also disposed in the gaps 21 between adjacent pairs of collecting and non-collecting anodes 8 and 12 as well as between guard ring 24 and either a collecting anode 8, a non-collecting anode 12, lateral conductor 18 or lateral conductor 22, as the case may be. The portion of insulator 26 on the sides of body 2 can be the same or different than the portion of insulator 26 on the surface of body 2 that includes anode structure 6. For example, insulator 26 can be an insulating paint well-known in the art, or an insulator deposited by evaporation or sputtering, such as AlN, $Al_2O_3$ or $Si_3N_4$. However, this is not to be construed as limiting the invention since it is envisioned that the insulator on the sides of body 2 and/or the insulator on the surface of body 2 including anode structure 6 can be any insulator deemed suitable and/or desirable by one of ordinary skill in the art.

In use of detector 1, a cathode bias voltage (a negative high voltage) is applied across the detector to cause electrons occurring in body 2 in response to ionizing radiation impinging on body 2 to drift toward anode structure 6. Additional bias voltages are applied between collecting anodes 8 and non-collecting anodes 12 of anode structure 6 whereupon electrons in body 2 are steered toward collecting anodes 8. This additional bias is small compared to the bias applied to cathode 4, such that most of the volume of body 2 experiences a linear electric field. Desirably, only very near collecting anodes 8 and non-collecting anodes 12 is the electric field bent toward collecting anodes 8.

Factors that affect the performance of radiation detector 1 include material uniformity, charge transport properties, bulk resistivity, surface passivation and the design of anode structure 6.

Information regarding prior art radiation detectors can be found in U.S. Pat. Nos. 5,530,249; 5,777,338; and 6,043,106, in an article by P. N. Luke, entitled "Unipolar Charge Sensing With Coplanar Electrodes-Application To Semiconductor Detectors", IEEE Trans. Nucl. Sci., Vol. 42, No. 4, pp. 207-213, August 1995 and in an article by P. N. Luke et al., entitled "A CdZnTe Coplanar-Grid Detector Array For Environmental Remediation", Nuclear Instruments And Methods In Physics Research A 458 (2001) 319-324.

While the performance of radiation detector 1 shown in FIGS. 1 and 2 has been satisfactory, it would be desirable to provide a radiation detector device having improved performance.

SUMMARY OF THE INVENTION

The present invention is a semiconductor radiation detector that comprises a body of semiconducting material responsive to ionizing radiation for generating electron-hole pairs in the bulk of said body; a conductive cathode in contact with one surface of said body of semiconducting material; and a conductive anode on an opposite surface of said body of semiconducting material, said conductive anode comprising a first anode conductor in contact with the opposite surface of said body and a second anode conductor spaced from said first anode conductor on a side thereof opposite said body by an insulator.

The first anode conductor can comprise a first set of elongated conductors spaced from each other and defining elongated gaps therebetween.

The second anode conductor can comprise either a sheet of conductive material or a second set of elongated conductors each of which is positioned in alignment with one of the elongated gaps. Each elongated conductor of the second set of elongated conductors can overlay one of the elongated gaps, either wholly or partially. Each elongated conductor of the second set of elongated conductors can overlay one of the elongated gaps intermediate the sides of said gap.

The radiation detector can include an insulating material in the elongated gaps.

The body of semiconducting material can be $Cd_xZn_{1-x}Te$ ($0 \leqq x \leqq 1$).

The invention is also a semiconductor radiation detector comprising a body of semiconducting material responsive to ionizing radiation for generating electron-hole pairs in the bulk of said body; a conductive cathode overlaying a first surface of said body of semiconducting material; a first conductive anode overlaying a second surface of said body of semiconducting material; an insulator overlaying the first anode opposite said body of semiconducting material; and a second conductive anode overlaying the insulator opposite the first anode.

The first anode can comprise a first set of elongated conductors spaced from each other defining elongated gaps therebetween. The second anode can comprise a second set of elongated conductors spaced from each other defining elongated gaps therebetween. Each of one or more elongated conductors of the second set thereof is positioned overlaying an elongated gap between a pair of adjacent elongated conductors of the first set of elongated conductors.

The second set of elongated conductors can further include a pair of elongated conductors on opposites sides of the first set of elongated conductors, each of said pair of elongated conductors not in alignment with an elongated conductor of the first set of elongated conductors. The second set of elongated conductors can include at least one more elongated conductor than the first set of elongated conductors.

Each elongated conductor of the first set thereof can be positioned in alignment with an elongated gap between a pair of adjacent elongated conductors of the second set of elongated conductors.

Each elongated conductor of the second set thereof can be positioned intermediate the edges of the pair of adjacent elongated conductors of the first set thereof that define the elongated gap that said elongated conductor overlays.

The first anode can comprise a set of elongated conductors spaced from each other defining elongated gaps therebetween. The second anode can be a sheet.

Lastly, the invention is a semiconductor radiation detector comprising a body of semiconducting material responsive to ionizing radiation for generating electron-hole pairs in the bulk of said body, a conductive cathode on one side of said body and an anode structure on the other side of said body, said anode structure comprising a first plurality of spaced elongated conductive fingers in contact with the other side of said body and defining between each pair of fingers thereof an elongated gap and a second plurality of spaced elongated conductive fingers positioned spaced from the first plurality of spaced elongated conductive fingers on a side thereof opposite the body, with each of one or more fingers of the second plurality of spaced elongated conductive fingers overlaying the elongated gap between a pair of adjacent fingers of the first plurality of spaced elongated conductive fingers.

At least one finger of the second plurality of spaced elongated conductive fingers can be positioned intermediate the edges of the pair of adjacent elongated conductive fingers of the first plurality thereof that define the elongated gap that said elongated conductive finger overlays.

The first and second pluralities of spaced elongated conductive fingers can be spaced from each other by an insulator.

The insulator can be AlN, $Al_2O_3$ or $Si_3N_4$. The insulator can have a thickness between 10 nm and 1000 nm and, more desirably, between 50 nm and 300 nm.

In plan view of the anode structure, the first and second pluralities of spaced elongated conductive fingers desirably appear interdigitated.

DETAILED DESCRIPTION OF THE INVENTION

The present invention will now be described with reference to the accompanying figures where like reference numbers correspond to like elements.

Figure 1:
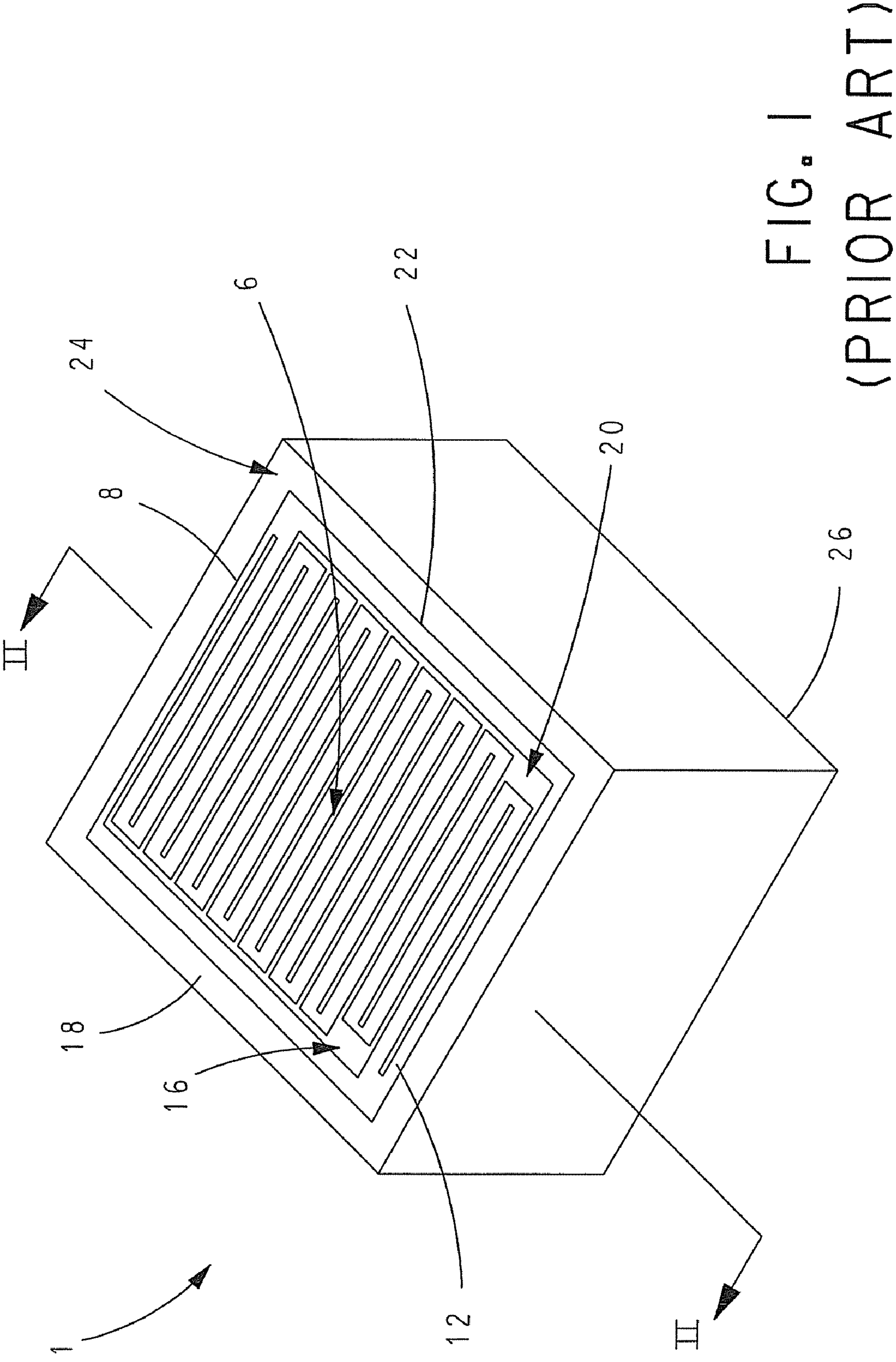
FIG. 1 (PRIOR ART)
FIG. 1 is a perspective view of a radiation detector including interdigitated anodes in accordance with the prior art.
Figure 2:
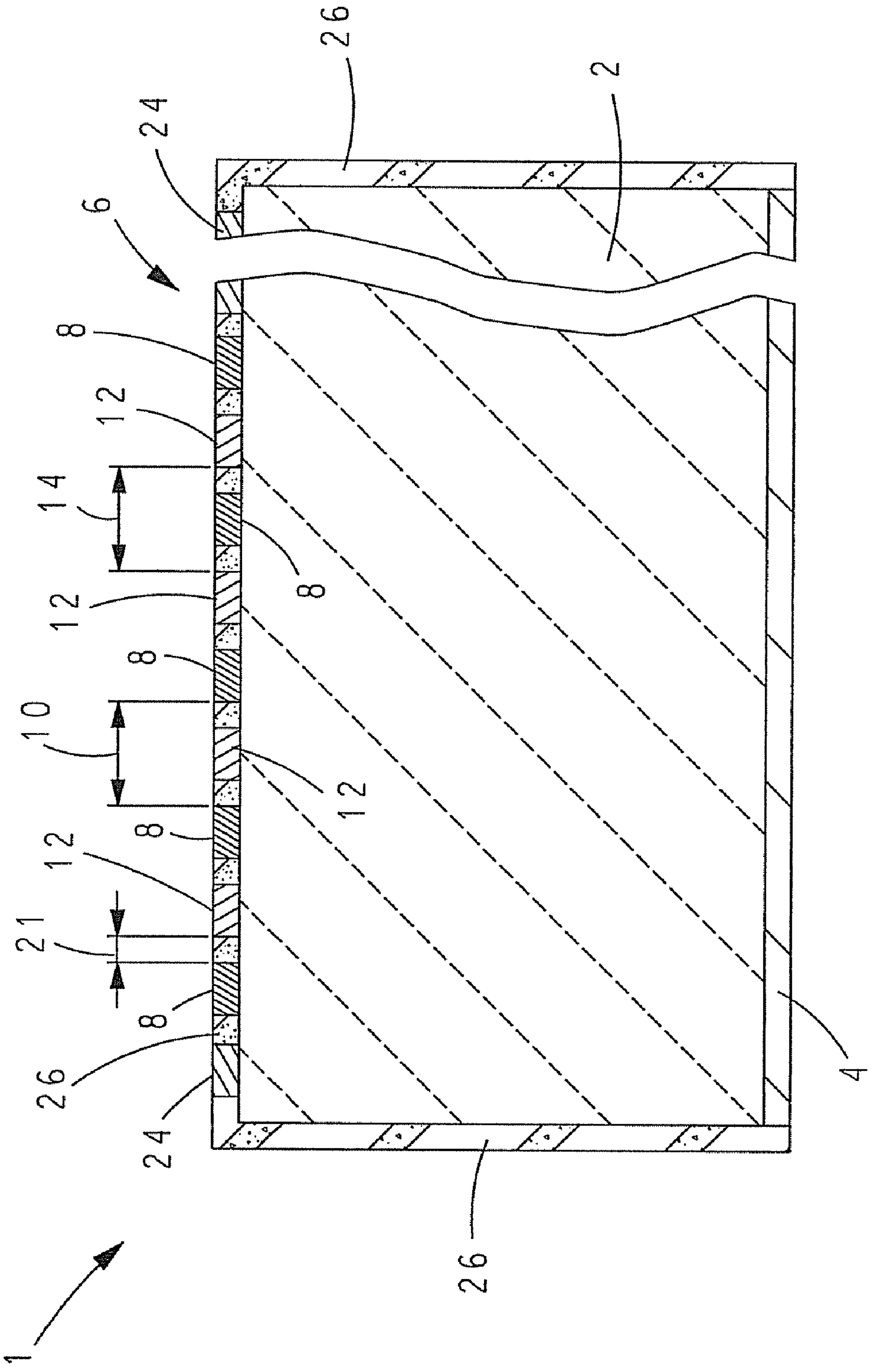
FIG. 2 (PRIOR ART)
FIG. 2 is a section taken along lines II-II in FIG. 1.
Figure 3:
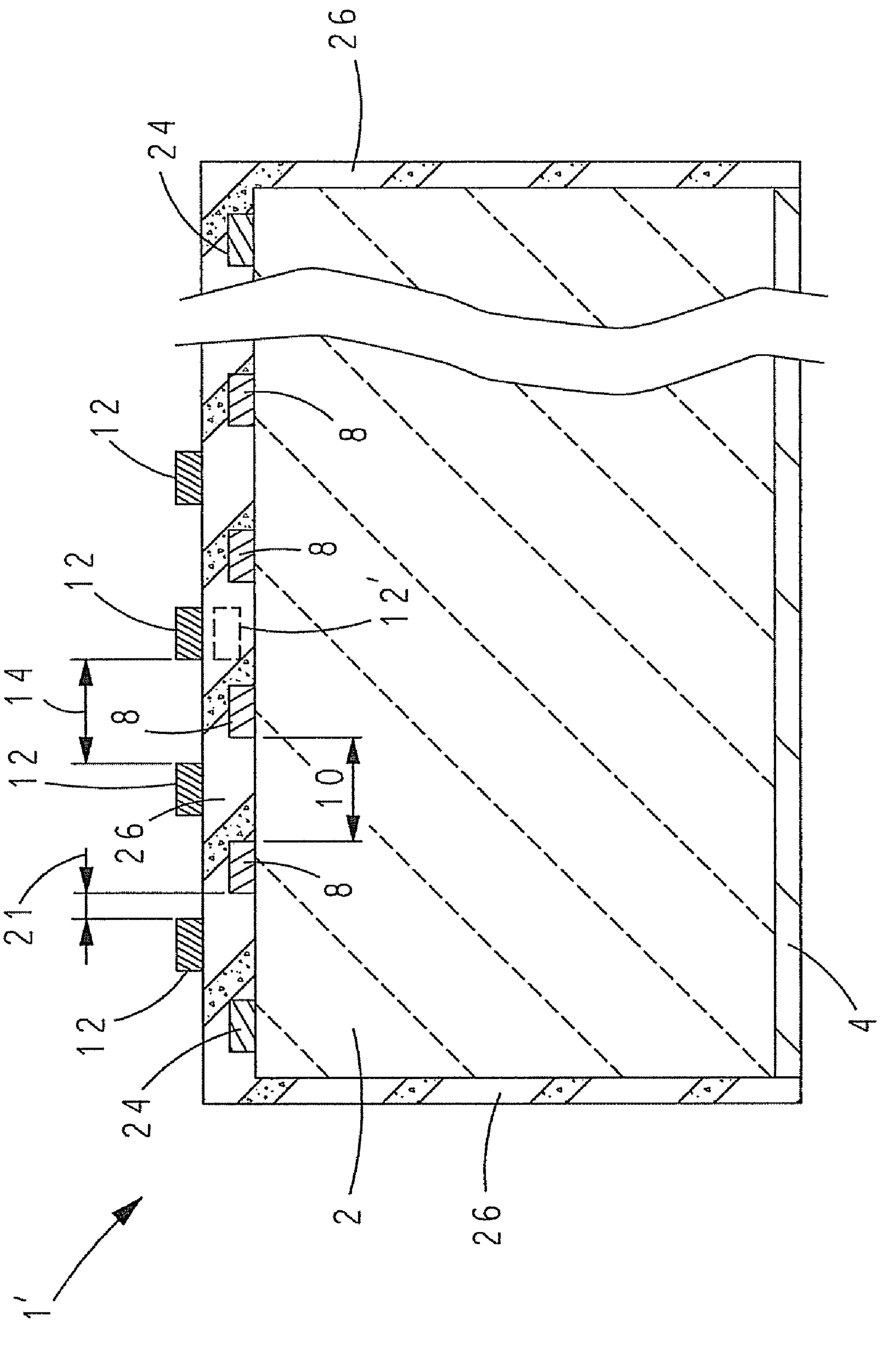
FIG. 3 is a cross-sectional view of a first embodiment radiation detector having its collecting and non-collecting anodes in different planes in accordance with the present invention.

With reference to FIG. 3 and with continuing reference to FIGS. 1 and 2, instead of non-collecting anodes 12 being in the same plane as collecting anodes 8, a radiation detector 1' in accordance with the present invention includes non-collecting anodes 12 disposed in a plane above collecting anodes 8 via insulator 26 disposed on the surface of body 2 that includes collecting anodes 8.

In FIG. 3, and in FIGS. 4 and 5 discussed hereinafter, the thickness of insulator 26 separating non-collecting anodes 12 from the surface of body 2 is shown exaggerated for illustration purposes. In practice, however, non-collecting anodes 12 can be separated by way of insulator 26 from the surface of body 2 that includes collecting anodes 8 by any distance deemed suitable and/or desirable by one of ordinary skill in the art. For example, each non-collecting anode 12 can be positioned slightly above the surface of body 2 as shown in phantom by non-collecting anode 12' that is positioned substantially between a pair of collecting anodes 8. Alternatively, each non-collecting anode 12 can be positioned in a plane that extends above the top surfaces of collecting anodes 8 opposite body 2, as shown in FIG. 3. In still yet another alternative, each collecting anode 8 can be positioned by insulator 26 above the surface of body 2 anywhere between the positions shown in phantom by non-collecting anode 12' and non-collecting anodes 12, provided the collecting anodes 8 lie in a first plane while non-collecting anodes 12 lie in a second, different plane.

As can be seen by comparing FIGS. 2 and 3, the only difference between the embodiments of radiation detectors 1 and 1' is the separation of non-collecting anodes 12 from the surface of body 2 that includes collecting anodes 8. To this end, even the distance of each gap 21 between opposing sides of each pair of adjacent collecting and non-collecting anodes 8 and 12 can be the same in the illustrated embodiments of radiation detectors 1 and 1'.

In one exemplary embodiment of radiation detector 1', each collecting anode 8 and non-collecting anode 12 is between 20 nm and 1000 nm thick and insulator 26 separating non-conducting anodes 12 from body 2 is between 10 nm and 1000 nm thick. Thus, non-conducting anodes 12 can be as close as 10 nm to the surface of body 2 that includes collecting anodes 8, or can be as far away as 1000 nm from said surface.

Desirably, the portion of insulator 26 separating non-collecting anodes 12 from the surface of body 2 is made from a suitable insulator, such as AlN, $Al_2O_3$ or $Si_3N_4$ that is applied by sputtering or vapor deposition. In contrast, the portion of insulator 26 on the sides of body 2 is desirably an insulating paint that is applied to the sides of body 2 in any suitable and/or desirable manner. However, this is not to be construed as limiting the invention since it is envisioned that insulator 26 on the sides of body 2 and insulator 26 on the surface of body 2 that includes collecting anodes 8 can be made from the same material.

Figure 4:
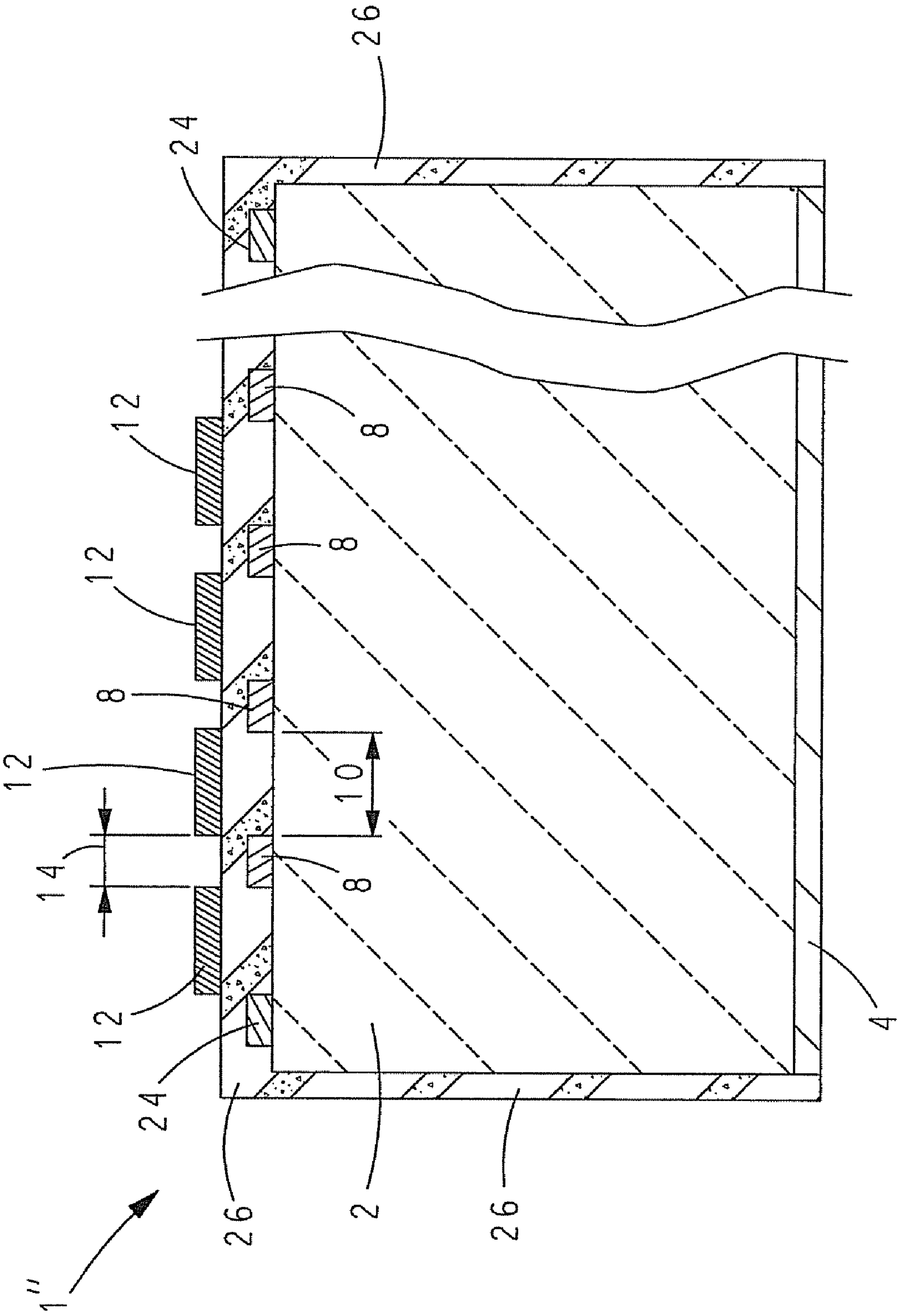
FIG. 4 is a cross-sectional view of a second embodiment radiation detector having its collecting and non-collecting anodes in different planes in accordance with the present invention.

With reference to FIG. 4 and with continuing reference to FIGS. 1-3, another embodiment radiation detector 1" is generally the same as the embodiment of radiation detector 1' shown in FIG. 3. However, in the embodiment of radiation detector 1" shown in FIG. 4, each non-collecting anode 12 has a width that substantially or completely spans the width of gap 10 between adjacent collecting anodes 8. Thus, gap 21 in FIG. 3 between adjacent collecting and non-collecting anodes 8 and 12 is either reduced substantially in width or eliminated in the embodiment of radiation detector 1" shown in FIG. 4. If desired, the width of each non-collecting anode 12 can be such that said non-collecting anode 12 slightly overlaps its corresponding adjacent pair of collecting anodes 8. Moreover, as shown in FIG. 4, one of the non-collecting anodes 12 can substantially or completely overlap the insulator 26 disposed between guard ring 24 and the collecting anode 8 adjacent thereto.

To facilitate each non-collecting anode 12 substantially or completely spanning gap 10 between adjacent collecting anodes 8, the thickness of insulator 26 on the surface of body 2 including collecting anodes 8 is such that the plane including non-collecting anodes 12 is above the surfaces of collecting anodes 8 opposite body 2.

The embodiment of radiation detector 1" in FIG. 4 shows each non-collecting anode 12 having a wider width than the width of each collecting anode. However, this is not to be construed as limiting the invention since it is envisioned that the width of each non-collecting anode 12 can be the same as the width of each collecting anode 8. Moreover, it is also envisioned that the width of each gap 10 can be the same as the width of each gap 14.

Figure 5:
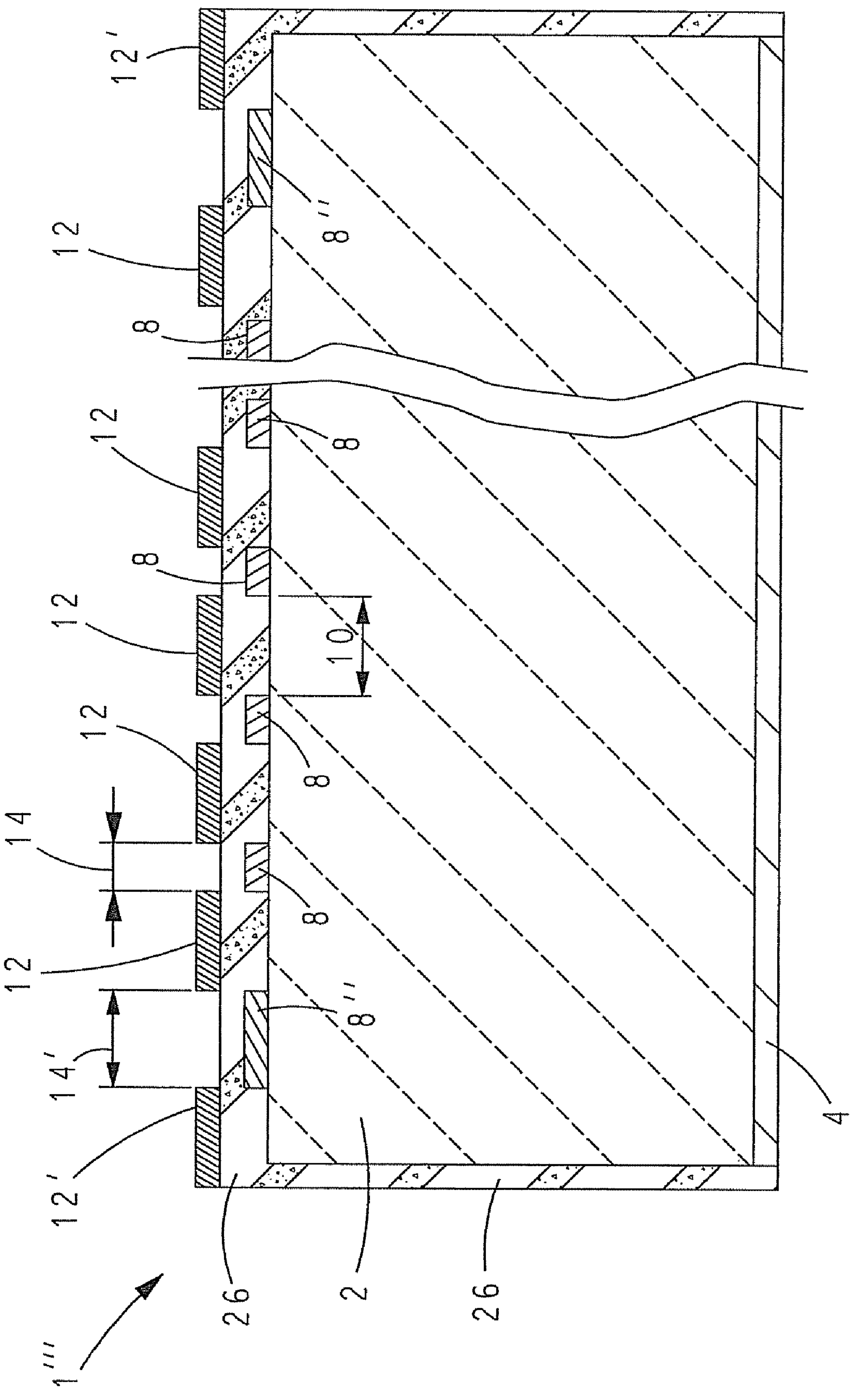
FIG. 5 is a cross-sectional view of a third embodiment radiation detector having its collecting and non-collecting anodes in different planes in accordance with the present invention.

With reference to FIG. 5 and with reference to FIGS. 1-4, another embodiment radiation detector 1''' excludes guard ring 24 and includes on opposite sides of body 2 a pair of collecting anodes 8' positioned parallel to collecting anodes 8. As shown in FIG. 5, each collecting anode 8' has a width that is greater than the widths of collecting anodes 8, the latter of which desirably all have the same width, but which can have different widths. Desirably, the width of each collecting anode 8' is twice the width of each collecting anode 8. However, this is not to be construed as limiting the invention. Radiation detector 1''' also includes a pair of non-collecting anodes 12' positioned adjacent opposite sides of body 2 atop the portion of insulator 26 on the surface of body 2 that includes collecting anodes 8 and 8'.

Each collecting anode 8 and 8' is spaced from its adjacent collecting anode by the width of gap 10. Similarly, each pair of non-collecting anodes 12 are separated from each other by the width of gap 14, which, desirably, is the same as the width of gap 10. However, each non-collecting anode 12' is separated from its adjacent non-collecting anode 12 by a distance of width 14'. Desirably, each non-collecting anode 12 overlays a gap 10, each collecting anode 8 underlays a gap 14, each collecting anode 8' underlays a gap 14', and each non-collecting anode 12' does not overlay a collecting anode 8 or 8'. As can be seen from FIG. 5, the number of non-collecting anodes 12, 12' is greater, by one, than the number of collecting anode 8, 8'.

The use of wider collecting anodes 8' is believed to improve the performance radiation detector 1''' over a like detector not having wider collecting anodes 8'.

Figure 6:
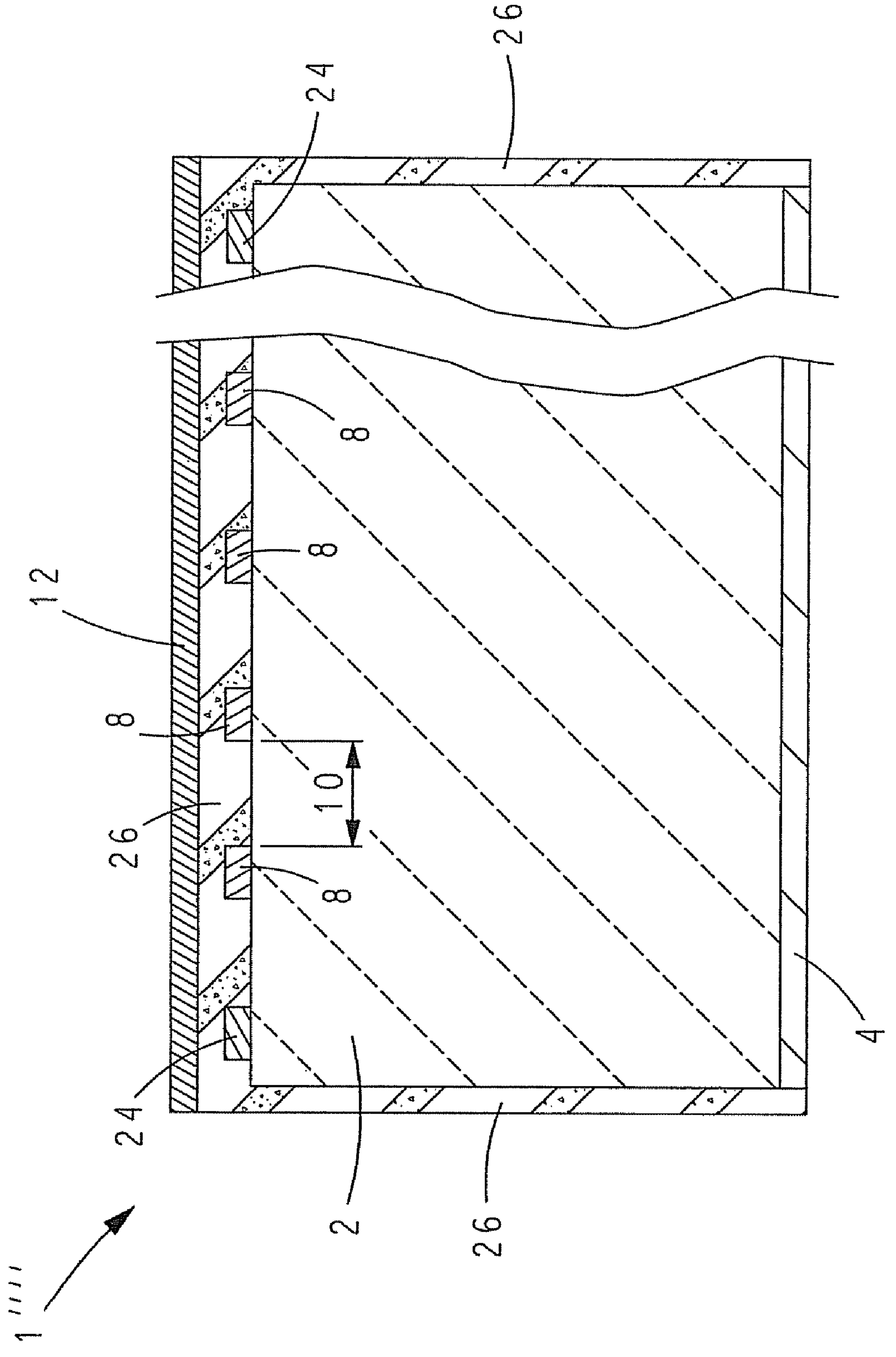
FIG. 6 is a cross-sectional view of a fourth embodiment radiation detector having its collecting and non-collecting anodes in different planes in accordance with the present invention.

Lastly, with reference to FIG. 6 and with continuing reference to FIGS. 1-5, another embodiment radiation detector 1'''' is similar to the embodiment of radiation detector 1" shown in FIG. 4 with the exception that instead of having multiple non-collecting anodes 12, a single non-collecting anode 12 is held in spaced relation with collecting anodes 8 by insulator 26. In the embodiment of radiation detector 1'''', gaps 14 between adjacent non-collecting anodes 12 have been completely eliminated.

In the embodiments of radiation detectors 1", 1''' and 1'''' discussed above, portion of insulator 26 on the sides of body 2 can be the same or different than the portion of insulator 26 atop the surface of body 2 including collecting anodes 8. In one embodiment, the portion of insulator 26 atop the surface of body 2 including collecting anodes 8 is made from AlN, $Al_2O_3$ or $Si_3N_4$ which is deposited via sputtering or evaporation, while the portion of insulator 26 on the sides of body 2 is an insulative paint which is well-known in the art and which is deposited thereon in any suitable and/or desirable manner known in the art. Alternatively, if desired, the portion of insulator 26 on the sides of body 2 can be made from the same material as the portion of insulator 26 atop the surface of body 2 including collecting anodes 8.

In use of the embodiments of radiation detectors 1', 1", 1''' and 1'''' shown in FIGS. 3, 4, 5 and 6, respectively, cathode 4 is desirably biased with a negative voltage −200 volts per millimeter of thickness of body 2. Thus, if body 2 is 10 mm thick, cathode 4 is biased to −2000 volts. In contrast, collecting anodes 8 are biased to approximately 0 volts, while non-collecting anode(s) 12 is/are biased to between −10 and −100 volts.

Benefits of the embodiments of radiation detectors 1', 1", 1''' and 1'''' shown in FIGS. 3, 4, 5 and 6, respectively, over the embodiment of radiation detector 1 shown in FIGS. 1 and 2 include less surface leakage current and less surface capacitance, especially with respect to the embodiments of radiation detectors 1', 1" and 1''' shown in FIGS. 3, 4 and 5, respectively.

The embodiments of radiation detector 1', 1" and 1''' shown in FIGS. 3, 4 and 5 either maintain gaps 21 between adjacent collecting and non-collecting anodes 8 and 12 (FIG. 3) or exclude said gaps 21 (FIGS. 4 and 5). However, it is to be appreciated that each gap 21 can be any width deemed suitable and/or desirable by one of ordinary skill in the art in order to optimize the performance of the corresponding radiation detector. Thus, within each radiation detector 1', 1", and 1''' the gaps 21 can have any suitable and/or desirable width, including zero width.

Benefits of the present invention include: (1) allows for the anode electrode widths and the gaps between anode electrodes to be variable, allowing for more refined pattern tuning of the electric field within body 2, thereby improving the photopeak resolution and shape; (2) reduces parasitic noise sources of surface leakage and inner-grid capacitance; (3) with lower surface leakage, larger bias resistors can be used lowering external circuit noise sources; and (4) at elevated temperatures, the insulating layer atop the surface of body 2 including collecting anodes 8 prevents the surface leakage from increasing as rapidly, thereby preserving improved operation of the radiation detector for a longer period of time.

The present invention finds particular applications with radiation detectors having a body made from $Cd_xZn_{1-x}Te$ ($0 \leqq x \leqq 1$). However, this is not to be construed as limiting the invention since it is envisioned that the present invention may also find application with radiation detectors having bodies made from other suitable semiconducting materials.

The present invention has been described with reference to the preferred embodiments. Obvious modifications and alterations will occur to others upon reading and understanding the preceding detailed description. For example, as discussed above, the guard ring 24 shown in the various embodiments of radiation detector discussed above is optional. Accordingly, the illustration of a guard ring 24 in any of the foregoing embodiments is not to be construed as limiting the invention. Moreover, the structure shown as guard ring 24 in the various embodiments of radiation detector in accordance with the present invention can be replaced with collecting anodes 8 arranged like the previously described collecting anodes 8. It is intended that the invention be construed as including all such modifications and alterations insofar as they come within the scope of the appended claims or the equivalents thereof.

The invention claimed is:

1. A semiconductor radiation detector comprising:

a body of semiconducting material responsive to ionizing radiation for generating electron-hole pairs in the bulk of said body;

a conductive cathode in contact with one surface of said body of semiconducting material;

a first conductive anode in contact with the surface of said body opposite said one surface thereof, said first anode comprising a first set of spaced-apart elongated conductors and defining elongated gaps therebetween;

an insulator overlaying the first anode and said elongated gaps opposite said one surface of said body of semiconducting material; and a second conductive anode overlaying the insulator opposite said one surface of said body of semiconducting material.

2. The radiation detector of claim 1, wherein a distance between the second anode and the body is greater than the thickness of the first anode.

3. The radiation detector of claim 2, wherein the second anode comprises a sheet of conductive material.

4. The radiation detector of claim 2, wherein the second anode comprises a second set of elongated conductors each of which is positioned in alignment with one of the elongated gaps.

5. The radiation detector of claim 4, wherein each elongated conductor of the second set of elongated conductors overlays one of the elongated gaps.

6. The radiation detector of claim 4, wherein each elongated conductor of the second set of elongated conductors partially overlays one of the elongated gaps.

7. The radiation detector of claim 6, wherein each elongated conductor of the second set of elongated conductors overlays one of the elongated gaps intermediate the sides of said gap.

8. The radiation detector of claim 4, wherein the second set of elongated conductors further includes a pair of elongated conductors on opposites sides of the first set of elongated conductors, each of said pair of elongated conductors not in alignment with an elongated conductor of the first set of elongated conductors.

9. The radiation detector of claim 4, wherein each elongated conductor of the first set thereof is positioned in alignment with an elongated gap between a pair of adjacent elongated conductors of the second set of elongated conductors.

10. The radiation detector of claim 4, wherein in plan view of the anode structure, the first and second sets of elongated conductors appear interdigitated.

11. The radiation detector of claim 1, wherein:

the second anode comprises a second set of elongated conductors each of which is positioned in alignment with one of the elongated gaps; and a distance between the second anode and the body is no greater than the thickness of the first anode.

12. The radiation detector of claim 1, wherein the body of semiconducting material is $Cd_xZn_{1-x}Te$ ($0 \leqq x \leqq 1$).

13. The radiation detector of claim 1, wherein the insulator is chosen from the group: AlN, $Al_2O_3$ and $Si_3N_4$.

14. The radiation detector of claim 1, wherein the insulator has a thickness desirably between 10 nm and 1000 nm.

15. The radiation detector of claim 1, wherein:

a) the first anode comprises a pair of elongated outside conductors on the outside of the first anode and a plurality of elongated internal conductors between the pair of outside conductors;

b) the internal conductors are substantially equivalent in width; and;

c) the outside conductors are wider than the internal conductors.

16. The radiation detector of claim 15, wherein the outside conductors are approximately twice as wide as the internal conductors.

* * * * *